United States Patent
Meinel et al.

(10) Patent No.: US 8,607,631 B2
(45) Date of Patent: Dec. 17, 2013

(54) HEATED AIR MASS WCSP PACKAGE AND METHOD FOR ACCELEROMETER

(75) Inventors: Walter B. Meinel, Tucson, AZ (US); Kalin V. Lazarov, Colorado Springs, CO (US)

(73) Assignee: Texas Instruments Incorporated, Dallas, TX (US)

( * ) Notice: Subject to any disclaimer, the term of this patent is extended or adjusted under 35 U.S.C. 154(b) by 278 days.

(21) Appl. No.: 13/066,746

(22) Filed: Apr. 22, 2011

(65) Prior Publication Data

US 2012/0266672 A1 Oct. 25, 2012

(51) Int. Cl.
*G01P 15/00* (2006.01)
*G01P 15/08* (2006.01)

(52) U.S. Cl.
USPC .................................. 73/514.05; 73/514.09

(58) Field of Classification Search
USPC ............... 73/514.09, 514.03, 514.05, 514.06, 73/514.07, 654, 504.05, 504.06, 504.07
See application file for complete search history.

(56) References Cited

U.S. PATENT DOCUMENTS

| | | | |
|---|---|---|---|
| 4,478,077 A * | 10/1984 | Bohrer et al. | 73/204.26 |
| 6,182,509 B1 * | 2/2001 | Leung | 73/514.05 |
| 7,069,785 B2 * | 7/2006 | Chou | 73/514.09 |
| 7,392,703 B2 * | 7/2008 | Zhao et al. | 73/514.05 |
| 7,424,826 B2 * | 9/2008 | Hua et al. | 73/514.05 |
| 7,562,574 B2 * | 7/2009 | Moon et al. | 73/521 |
| 7,735,368 B2 * | 6/2010 | Nakatani | 73/497 |
| 7,856,879 B2 * | 12/2010 | Cai | 73/514.09 |
| 8,393,210 B2 * | 3/2013 | Leung | 73/504.05 |
| 2009/0145226 A1 * | 6/2009 | Cai | 73/514.09 |

OTHER PUBLICATIONS

"A Micromachined Thermal Accelerometer for Motion, Inclination, and Vibration Measurement" by Bugnacki et al., Mesmic Inc., Questex Media, 2009, 14 pages.
"A CMOS Compatible Thermal Accelerometer Without solid Proof Mass, Based on Porous Silicon Thermal Isolation" by Goustouridis et al, IEEE, 2004, pp. 848-851.
"Micromachined thermal accelerometer" by Mailly et al., Elsevier Science, 2002, pp. 359-363.
MXD6125Q "Ultra High Performance ±1g Dual Axis Accelerometer with Digital Outputs", Memsic, Feb. 27, 2007, pp. 1-6.
"A Novel Two-Axis CMOS Accelerometer Based on Thermal Convection" by Shu-Jung Chen et al, IEEE, vol. 57, No. 8, Aug. 2008, pp. 1572-1577.

* cited by examiner

*Primary Examiner* — Helen Kwok
(74) *Attorney, Agent, or Firm* — Alan A. R. Cooper; W. James Brady, III; Frederick J. Telecky, Jr.

(57) ABSTRACT

An inertial sensor (16) includes a differential thermocouple (13) including first (4A) and second (4B) metal traces, a poly trace (6) with a first end connected to a first end of the first metal trace to form a first (−) thermocouple junction and a second end connected to a first end of the second metal trace to form a second (+) thermocouple junction. A gas mass (10) located symmetrically with respect to the thermocouple junctions is heated by a heater (8). Acceleration or tilting of the sensor shifts the relative location of the gas mass relative to the thermocouple junctions, causing differential heating thereof and generation of a corresponding thermocouple output signal.

22 Claims, 14 Drawing Sheets

HEATED AIR MASS WCSP PACKAGE AND METHOD FOR ACCELEROMETER

BACKGROUND OF THE INVENTION

The present invention relates generally to inertial sensors, such as heated air mass accelerometers, gyros, and the like, and more particularly to an air mass accelerometer sensor cell structure including a differential thermocouple and a heater which is adjacent to a poly (polycrystalline) silicon element that is common to a pair of thermocouples of the differential thermocouple.

In order to measure acceleration, it is necessary to have a mass which moves relative to a motion sensor. The most common low-cost method utilizes conductive, closely spaced fingers, the mutual capacitance of which changes when the motion sensor is subjected to acceleration. The major problem of such closely spaced conductive fingers is stiction that occurs under extreme acceleration. To avoid this problem, some prior inertial sensors utilize a heated air parcel as the mass, and measure the magnitude of the moving hot air mass on the temperatures of different thermocouples/thermopiles, and measure the resulting differential temperature change in the thermocouple/thermopile junctions to determine the acceleration.

FIG. 1 shows a section view diagram of a single conventional heated air mass accelerometer or inertial sensor cell 1-1 which includes a silicon substrate 2 having a dielectric region or layer 3 thereon. A cavity 9 has been etched into silicon substrate 2. The upper part of cavity 9 is bounded by the bottom surface of dielectric region 3. Dielectric region 3 is sometimes referred to as a "dielectric stack", and includes multiple dielectric layers on which various metal and polycrystalline silicon traces, respectively, are formed. In FIG. 1, a first thermocouple 7A of a thermopile Q1 formed in region 3 includes a metal trace 4A, a tungsten contact 5A, and a poly (i.e., polycrystalline silicon) trace 6A. (A thermopile is a "stack" or "pile" of thermocouples that are electrically coupled in series.) Similarly, a thermocouple 7B of thermopile Q3 is formed in region 3 and includes a metal trace 4B, a tungsten contact 5B, and a poly (i.e., polycrystalline silicon) trace 6B. Thermocouple 7A is one of a large number of identical thermocouples in a thermopile Q1 of a conventional accelerometer sensor or inertial sensor 13-1 shown in subsequently described FIG. 2. A voltage $V_{Q1}$, which is a function of the temperature of thermopile Q1, is developed across the terminals of thermopile Q1. Similarly, thermocouple 7B is one of a large number of identical thermocouples in a thermopile Q3 of conventional accelerometer sensor 13-1 shown in subsequently described FIG. 2, and a voltage $V_{Q3}$ is developed across the terminals of thermopile Q3.

Accelerometer cell 1-1 in FIG. 1 also includes a sichrome (SiCr) heater element 8. An air mass 10 located in cavity 9 is heated by heater 8. If accelerometer cell 1-1 moves laterally, the inertia of heated air mass 10 causes it to tend to remain stationary. Therefore, the distance between heated air mass 10 and the thermocouple junction of one of the thermocouples 7A and 7B decreases, and the distance between heated air mass 10 and the other thermocouple junction increases. This results in a difference in the temperatures of the two thermocouple junctions, and therefore results in a difference between the thermopile output voltages $V_{Q1}$ and $V_{Q3}$. An optional dome 13 which contains heated air mass 11 also may be provided to improve the performance of accelerometer cell 1-1.

Thermopiles Q1 and Q3 in accelerometer cell 1-1 each typically are composed of roughly 15 series-connected accelerometer cells 1-1, generally as shown in FIG. 1.

Referring to FIG. 2, accelerometer sensor 13-1 includes circular etchant openings 30 that extend through dielectric region 3 to cavity 9 (FIG. 1) to allow it to be etched as a single large cavity that extends beneath all of the thermopiles formed in the dielectric stack 3 on semiconductor substrate 2 (FIG. 1). In FIG. 2, sichrome heaters 8 are formed around the center region of the integrated circuit chip in which accelerometer sensor 13-1 is fabricated, so as to provide heating to a single large air mass that is much larger than air mass 10 in cavity 9 shown in FIG. 1. In FIG. 2, the cavity (e.g., cavity 9 of FIG. 1) extends beneath all of thermopiles 70A,B formed in the integrated circuit chip in which accelerometer sensor 13-1 is formed.

The thermopile output voltages $V_{Q1}$, $V_{Q2}$, $V_{Q3}$, and $V_{Q4}$ in FIG. 2 are developed across all of the thermocouple pairs 7A,7B (FIG. 1) that are contained in each of thermopiles Q1, Q2, Q3, and Q4, respectively. Quadrant thermopiles Q1 and Q3 are oriented in an "x" direction, and quadrant thermopiles Q2 and Q4 are oriented in an orthogonal "y" direction. Accordingly, the acceleration in the x direction is proportional to $V_{Q1}$ minus $V_{Q3}$, and acceleration in the y direction is proportional to $V_{Q2}$ minus $V_{Q4}$. A limitation of the technique shown in Prior Art FIGS. 1 and 2 is the number of thermocouples in the thermopile and the high resistance of the thermopile. Another limitation is the high cost of the required package, which needs to have a cavity to protect the thin membrane portion of the dielectric stack 3 over cavity 9 in the accelerometer.

There potentially is a much larger market than presently exists for inertial sensors, accelerometers, etc., for example in buildings, bridges, engines, and many other applications, if inertial sensors can be provided with sufficient accuracy and at sufficiently low cost.

Thus, there is an unmet need for a much lower cost inertial sensor than is presently available.

There also is an unmet need for an inertial sensor and method which can be provided using conventional integrated circuit processing techniques without use of additional costly MEMS (microelectromechanical systems) fabrication techniques.

There also is an unmet need for an inertial sensor which can be provided using conventional integrated circuit processing techniques and which requires substantially less integrated circuit chip area than the closest prior art.

There also is an unmet need for a low-cost inertial sensor and method which provides substantially better SNR (signal to noise ratio) operation than the closest prior art.

SUMMARY OF THE INVENTION

It is an object of the invention to provide a much lower cost accelerometer or inertial sensor than is presently available.

It is another object of the invention to provide an accelerometer or inertial sensor and method which can be fabricated using conventional integrated circuit processing techniques without use of additional costly MEMS (microelectromechanical systems) fabrication techniques.

It is another object of the invention to provide an inertial sensor which can be provided using conventional integrated circuit processing techniques and which requires substantially less integrated circuit chip area than the closest prior art.

It is another object of the invention to provide a low-cost accelerometer or inertial sensor and method which provide substantially better SNR (signal to noise ratio) operation than the closest prior art.

Briefly described, and in accordance with one embodiment, the present invention provides an inertial sensor (16) having a differential thermocouple (13) including first (4A) and second (4B) metal traces, a poly trace (6) with a first end connected to a first end of the first metal trace to form a first (−) thermocouple junction and a second end connected to a first end of the second metal trace to form a second (+) thermocouple junction. A gas mass (10) located symmetrically with respect to the thermocouple junctions is heated by a heater (8), or 6 in FIG. 13. Acceleration or tilting of the sensor shifts the relative location of the gas mass relative to the thermocouple junctions, causing differential heating thereof and consequently causing a corresponding thermocouple output signal to be generated.

In one embodiment, the invention provides a differential thermocouple (13) including first (4A) and second (4B) metal traces, a poly trace (6), a first contact element (5A) electrically connecting a first end of the first metal trace (4A) to a first end of the poly trace (6) to form a first (+) thermocouple junction, and a second contact element (5B) electrically connecting a first end of the second metal trace (4B) to a second end of the poly trace (6) to form a second (−) thermocouple junction. The differential thermocouple (13) produces a differential voltage ($V^+$−$V^-$) between second ends of the first (4A) and second (4B) metal traces. The heater (8) is aligned with respect to the first (+) and second (−) thermopile junctions. A region (9,12) proximate to the heater (8) and the poly trace (6) encloses a mass of gas (10) that is heated by the heater (8) and is located symmetrically with respect to the first (+) and second (−) thermocouple junctions while the differential thermocouple (13) has a predetermined initial orientation (e.g., a "level" orientation) and a predetermined initial acceleration that result in balanced thermal coupling between the heated gas mass (10) and the first (+) and second (−) thermocouple junctions so as to cause a predetermined initial value (e.g., for zero initial acceleration) of the differential voltage ($V^+$−$V^-$). A change in either the predetermined initial orientation or the predetermined initial acceleration shifts the location of the heated gas mass (10) relative to the first (+) and second (−) thermocouple junctions so as to cause a corresponding change in the differential voltage ($V^+$−$V^-$).

In one embodiment, the region is bounded by a cavity (9) in a semiconductor substrate (2) supporting a dielectric region (3) in which the differential thermocouple (13) and heater (8) are disposed. In one embodiment, the differential thermocouple (13) is included in a sensor cell (1-2) wherein the heater (8) and the heated air mass (10) are associated with the sensor cell (1-2). That is, the heater (8) and the heated air mass (10) either are part of the sensor cell or are shared with other sensor cells. The inertial sensor includes a plurality of such sensor cells (1-2) connected in series such that their differential voltages ($V^+$−$V^-$) are summed. In one embodiment, each sensor cell (1-2) includes a separate heater (8) and a corresponding heated air mass (10), respectively. In another embodiment, each sensor cell (1-2) shares the heater (8) and the heated air mass (10) with other sensor cells (1-2).

In one embodiment, the heater (8) is composed of sichrome located on a different layer of the dielectric region (3) than the poly trace (6). In another case, the poly trace (6) includes first (6-1) and second (6-2) portions located adjacent to opposed ends, respectively, of a poly heater (8). A metal bridge (40) electrically connects the first (6-1) and second (6-2) portions of the poly trace (6). In another embodiment, the heater (8) is composed of poly located on the same layer of the dielectric region (3) as the poly trace (6). In this case, a portion (6A) of the poly trace (6) is routed around the poly heater (8).

In a described embodiment, the region (9) is bounded by a cavity (9) in a semiconductor substrate (2) supporting a dielectric region (3) in which the thermocouple junction (13) and the heater (8) are disposed, wherein the cavity (9) extends beneath all of the plurality of sensor cells (1-2).

In a described embodiment, the inertial sensor includes CMOS circuitry (42) coupled to receive the sum ($V_{OUT}^+$−$V_{OUT}^-$) of the differential voltages ($V^+$−$V^-$) generated by the plurality of sensor cells (1-2), wherein the CMOS circuitry (42) includes an amplifier for amplifying the sum ($V_{OUT}^+$−$V_{OUT}^-$) of the differential voltages ($V^+$−$V^-$) and an analog to digital converter for digitizing an output signal produced by the amplifier.

In one embodiment, the inertial sensor is included in a semiconductor chip that is part of a WCSP package. In one embodiment, a thermal shield (29) in the dielectric region (3) is located over the differential thermocouple (13) to isolate the differential thermocouple (13) from effects of external heat.

In one embodiment, the invention provides an inertial sensor method including providing a differential thermocouple (13) including first (4A) and second (4B) metal traces and a poly trace (6), by electrically coupling a first end of the first metal trace (4A) to a first end of the poly trace (6) to form a first (+) thermocouple junction and by electrically coupling a first end of the second metal trace (4B) to a second end of the poly trace (6) to form a second (−) thermocouple junction, the differential thermocouple (13) producing a differential voltage ($V^+$−$V^-$) between second ends of the first (4A) and second (4B) metal traces, the differential voltage ($V^+$−$V^-$) being representative of a temperature difference between the first (+) and second (−) thermocouple junctions; and heating a mass of gas (10) that is located generally symmetrically with respect to the first (+) and second (−) thermocouple junctions while the differential thermocouple (13) has a predetermined initial orientation and a predetermined initial acceleration (which may be zero or any other value) that result in balanced thermal coupling between the heated gas mass (10) and the first (+) and second (−) thermocouple junctions so as to cause a predetermined initial value of the differential voltage ($V^+$−$V^-$). A change in the predetermined initial orientation or the predetermined initial acceleration shifts the location of the heated gas mass (10) relative to the first (+) and second (−) thermocouple junctions so as to cause a corresponding change in the differential voltage ($V^+$−$V^-$).

In one embodiment, the method includes enclosing the heated gas mass (10) in a cavity (9) in a semiconductor substrate (2) supporting a dielectric region (3) in which the thermocouple junction (13) and a heater (8) are disposed.

In one embodiment, the method includes connecting a plurality of the differential thermocouples (13) in series in the dielectric region (3) such that the differential voltages ($V^+$−$V^-$) of the plurality of differential thermocouples (13) are summed, wherein the heater (8) and the and heated air mass (10) are associated with at least one of the differential thermocouples (13). In another embodiment, the method includes connecting a plurality of the differential thermocouples (13) in series in the dielectric region (3) such that the differential voltages ($V^+$−$V^-$) of the plurality of differential thermocouples (13) are summed, wherein each of the differential thermocouples (13) includes a corresponding heater (8) and a corresponding heated air mass (10).

CMOS circuitry (42) is coupled to receive the sum ($V_{OUT}^+$−$V_{OUT}^-$) of the differential voltages ($V^+$−$V^-$) generated by the plurality of differential thermocouples (13), wherein the CMOS circuitry (42) includes an amplifier for amplifying the sum ($V_{OUT}^+ - V_{OUT}^- - V_{OUT}^-$) of the differential voltages ($V^+ - V^-$) and an analog to digital converter for digitizing an output signal produced by the amplifier. In one embodiment, the method includes providing a semiconductor chip including the thermocouples (13), heater (8), and heated air mass (10) as part of a WCSP package.

In one embodiment, the invention provides an inertial sensor including a differential thermocouple (13) including first (4A) and second (4B) metal traces and a poly trace (6) having a first end electrically coupled to a first end of the first metal trace (4A) to form a first (+) thermocouple junction and a second end electrically coupled to a first end of the second metal trace (4B) to form a second (−) thermocouple junction, the differential thermocouple (13) producing a differential voltage ($V^+ - V^-$) between second ends of the first (4A) and second (4B) metal traces, the differential voltage ($V^+ - V^-$) being representative of a temperature difference between the first (+) and second (−) thermocouple junctions; and means (8) for heating a mass of gas (10) that is located generally symmetrically with respect to the first (+) and second (−) thermocouple junctions while the differential thermocouple (13) has a predetermined initial orientation and a predetermined initial acceleration that result in balanced thermal coupling between the heated gas mass (10) and the first (+) and second (−) thermocouple junctions so as to cause a predetermined initial value of the differential voltage ($V^+ - V^-$), whereby a change in the predetermined initial orientation or the predetermined initial acceleration shifts the location of the heated gas mass (10) relative to the first (+) and second (−) thermocouple junctions so as to cause a corresponding change in the differential voltage ($V^+ - V^-$).

DETAILED DESCRIPTION OF THE PREFERRED EMBODIMENTS

Figure 3:
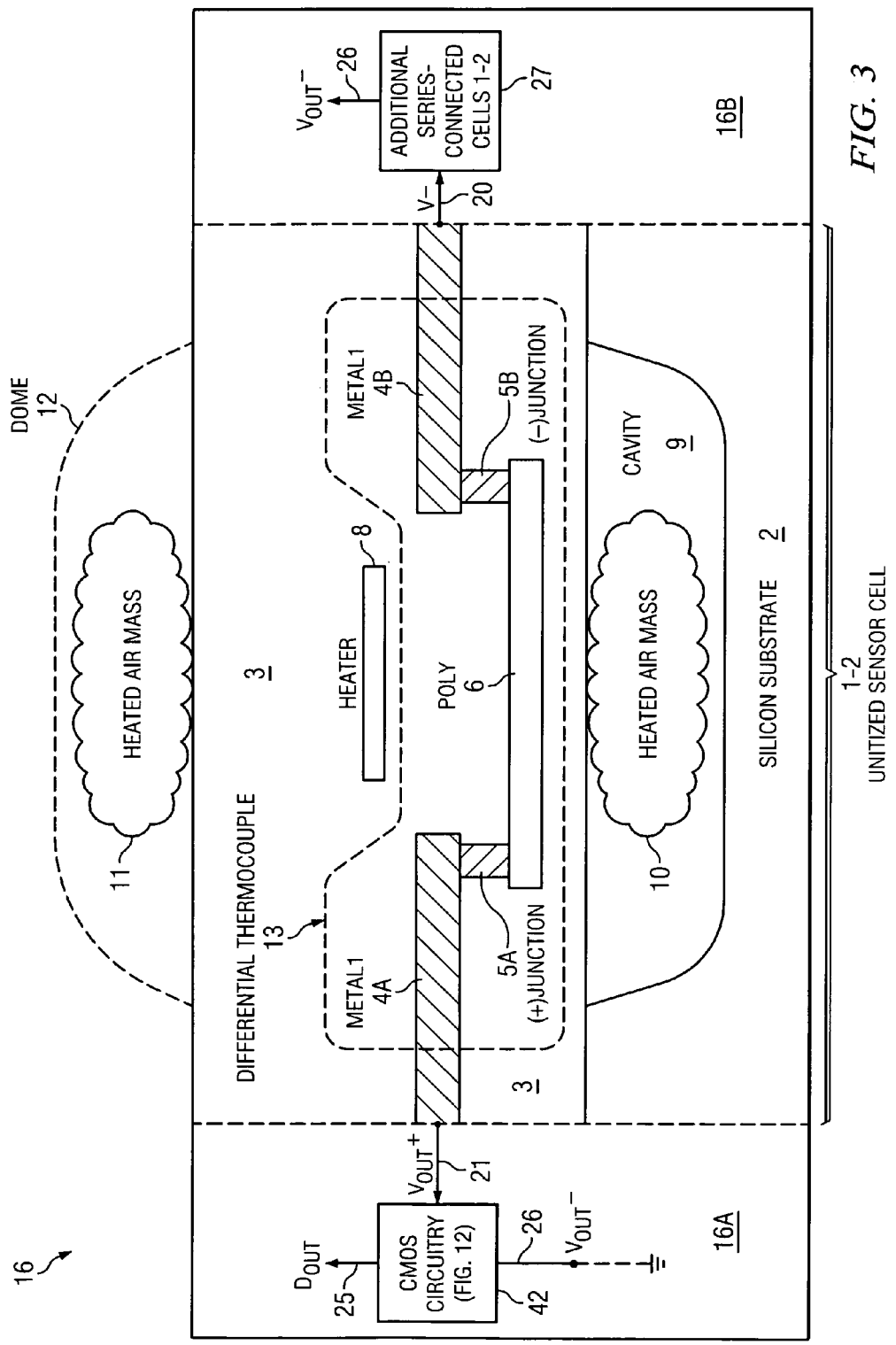
FIG. 3 shows a diagram of a heated air mass inertial sensor, such as an accelerometer sensor, including a large number of unitized heated air mass inertial sensor cells, including an enlarged partial section view of one of them.

FIG. 3 shows an integrated circuit accelerometer or inertial sensor chip 16 that may include a relatively large number of thermopiles each composed of a number of series-connected "unitized" sensor cells such as unitized sensor cell 1-2. An enlarged section view of a single unitized sensor 1-2 is illustrated. Unitized sensor cell 1-2 generates a voltage $V_{OUT}^+ - V^-$. CMOS circuitry 42 is shown in section 16A of accelerometer or inertial sensor chip 16, which hereinafter is referred to simply as accelerometer chip 16.

Unitized sensor cell 1-2 in FIG. 3 includes a silicon substrate 2 having a cavity 9 formed therein by a known etching process. Region 3 includes a conventional dielectric stack composed of multiple dielectric layers (not shown) on which various metal and poly traces are patterned. Conventional CMOS processing techniques are used so as to provide a "differential thermocouple" 13 and a heater 8 in sensor cell 1-2, and also to provide a large number (e.g., as many as 1000 or more) of additional series-connected unitized sensor cells in block 27 in section 16B of inertial sensor chip 16, and further provide the CMOS circuitry 42 in section 16A. Each of the unitized sensor cells 1-2 may be identical. Sensor cell 1-2 shown in the section view of FIG. 3, connected in series with the additional series-connected sensor cells 1-2 in block 27, form a thermopile having terminals 21 and 26. Thermopile output voltage $V_{OUT}^+$ is generated on conductor 21. Thermopile output voltage $V_{OUT}^-$ is generated on conductor 26 and typically is connected to ground or $V_{SS}$. The voltage $V_{OUT}^+$ generated on conductor 21 and the voltage $V^-$ on conductor 20 comprise the output generated by differential thermocouple 13. (Any particular differential thermocouple 13 in a thermopile generates a voltage $V^+$ on a (+) thermocouple junction conductor such as 21 and a voltage $V^-$ on a (−) thermocouple conductor such as conductor 20. In a thermopile, the highest voltage $V^+$ is equal to $V_{OUT}^+$, e.g., on conductor 21, and the lowest voltage $V^-$ is equal to $V_{OUT}^-$, e.g. on conductor 26, which typically is connected to ground.)

CMOS circuitry 42 operates on the difference between thermopile output voltage $V_{OUT}^+$ on conductor 21 and thermopile output voltage $V_{OUT}^-$ on conductor 26. CMOS circuitry 42 may include the circuitry indicated in subsequently described FIGS. 12 and 14.

Unitized sensor cell 1-2 in FIG. 3 includes differential thermocouple 13, a sichrome heater 8, and a heated air mass 10 in cavity 9. (Heated air mass 10 can be ordinary air, but for higher efficiency a higher thermal mass gas, such as sulfur hexafluoride, can be used to achieve higher sensitivity of accelerometer chip 16.) Differential thermocouple 13 includes a first thermocouple junction formed by one end of a metal trace 4A connected by a tungsten contact 5A to one end of common poly trace 6 to form a (+) thermocouple junction. The other end of poly trace 6 is connected by another tungsten contact 5B to one end of another metal trace 4B to form a (−) thermocouple junction. The other end of metal trace 4A is connected to $V_{OUT}^+$ conductor 21, and the other end of metal trace 4B is connected to V⁻ conductor 20.

Sichrome heater 8 as shown in FIG. 3 is located directly above common poly trace 6. As in Prior Art FIG. 1, an optional dome chamber 12 may be provided above dielectric region 3 to contain a second air mass 11 that also is heated by heater 8 so as to increase the sensitivity of accelerometer chip 16. (Note that it would be possible to omit cavity 9 and lower heated air mass 10 and provide only the upper dome chamber 12 and heated air mass 11.) With heater 8 located over the center of common poly trace 6 and the two thermopile junctions symmetrically positioned on each side thereof, the thermopile voltage output is generally proportional to the temperature difference between those two thermopile junctions and therefore also is generally proportional to any acceleration that causes relative movement of the air mass away from the center of common poly trace 6. It should be noted that each of the unitized sensor cells 1-2 in the embodiment of FIG. 3 has its own exclusive heated air mass 10. The smaller size of the differential thermocouples results in a lower thermopile resistance than the thermopile resistance of the devices of Prior Art FIGS. 1 and 2, so there can be more thermocouples per unit area forming the general configuration of FIG. 3. The lower resistance results in a better SNR (signal to noise ratio), and the larger number of thermocouples per unit of chip area results in a larger thermopile output voltage then can be achieved by the closest prior art.

The provision of common poly trace 6 (as shown in FIG. 3) allows more efficient layout of the conductors used for connecting the two thermocouples of each differential thermocouple 13 to each other and to circuitry utilized for amplifying and processing the temperature-dependent voltages generated by the thermocouples. The cumulative length of poly traces 6 of the unitized sensor cells 1-2 in a thermopile is much shorter than the cumulative metal length therein. Because of the relatively high resistivity of the poly, this substantially reduces the overall thermopile resistance. The reduced total thermopile resistance of the common poly traces 6 also results in a substantial improvement in SNR (signal to noise ratio) of unitized sensor cells 1-2 of FIG. 3 compared to the SNR of the conventional heated air mass sensor cell shown in Prior Art FIG. 1. The foregoing statement applies to the SNR of either a single unitized sensor cell 1-2 or the SNR of a complete accelerometer in which a large number of the unitized sensors 1-2 of the present invention are utilized.

Figure 1:
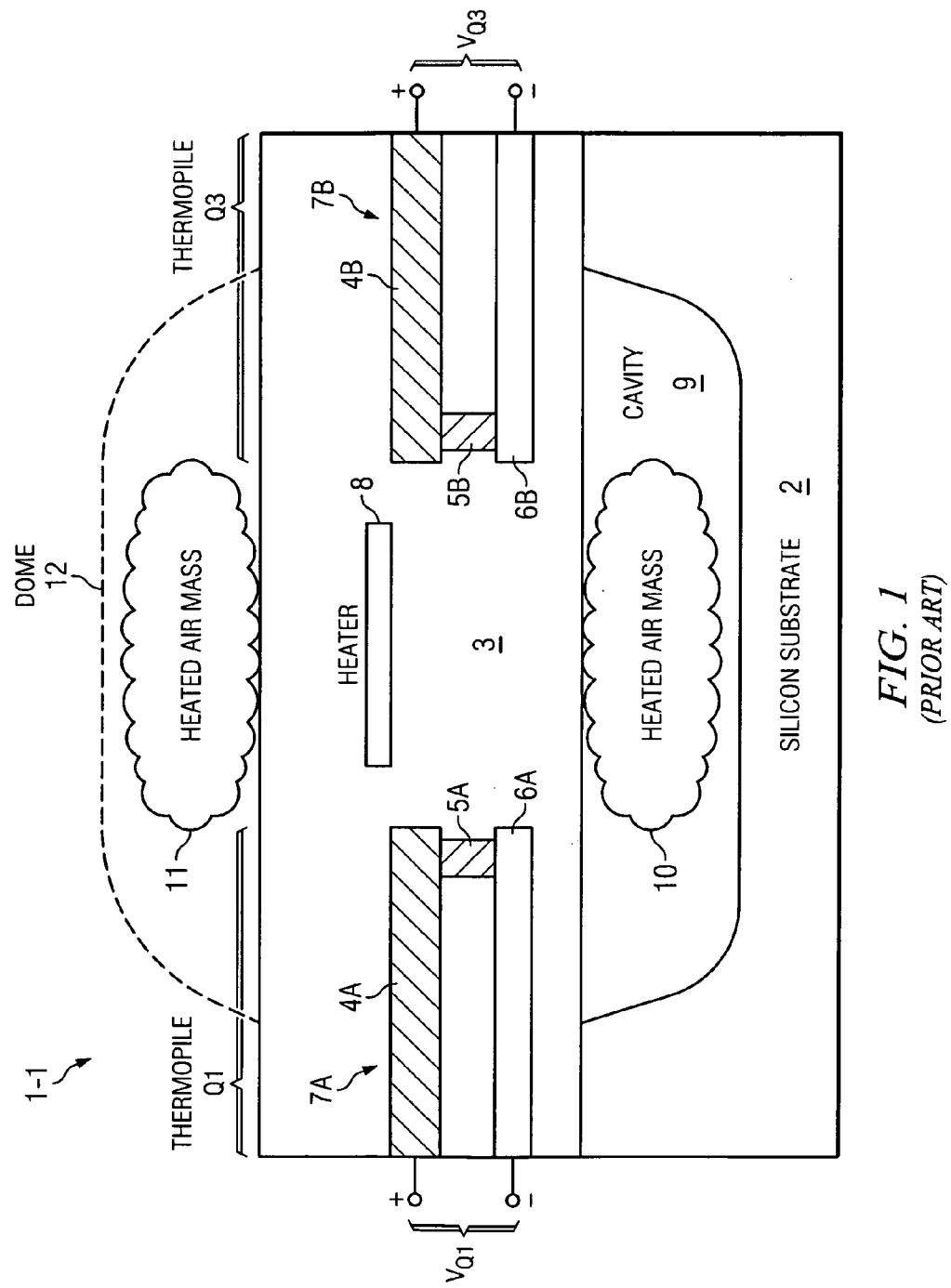
FIG. 1 shows a section view of a conventional heated air mass accelerometer cell.
Figure 2:
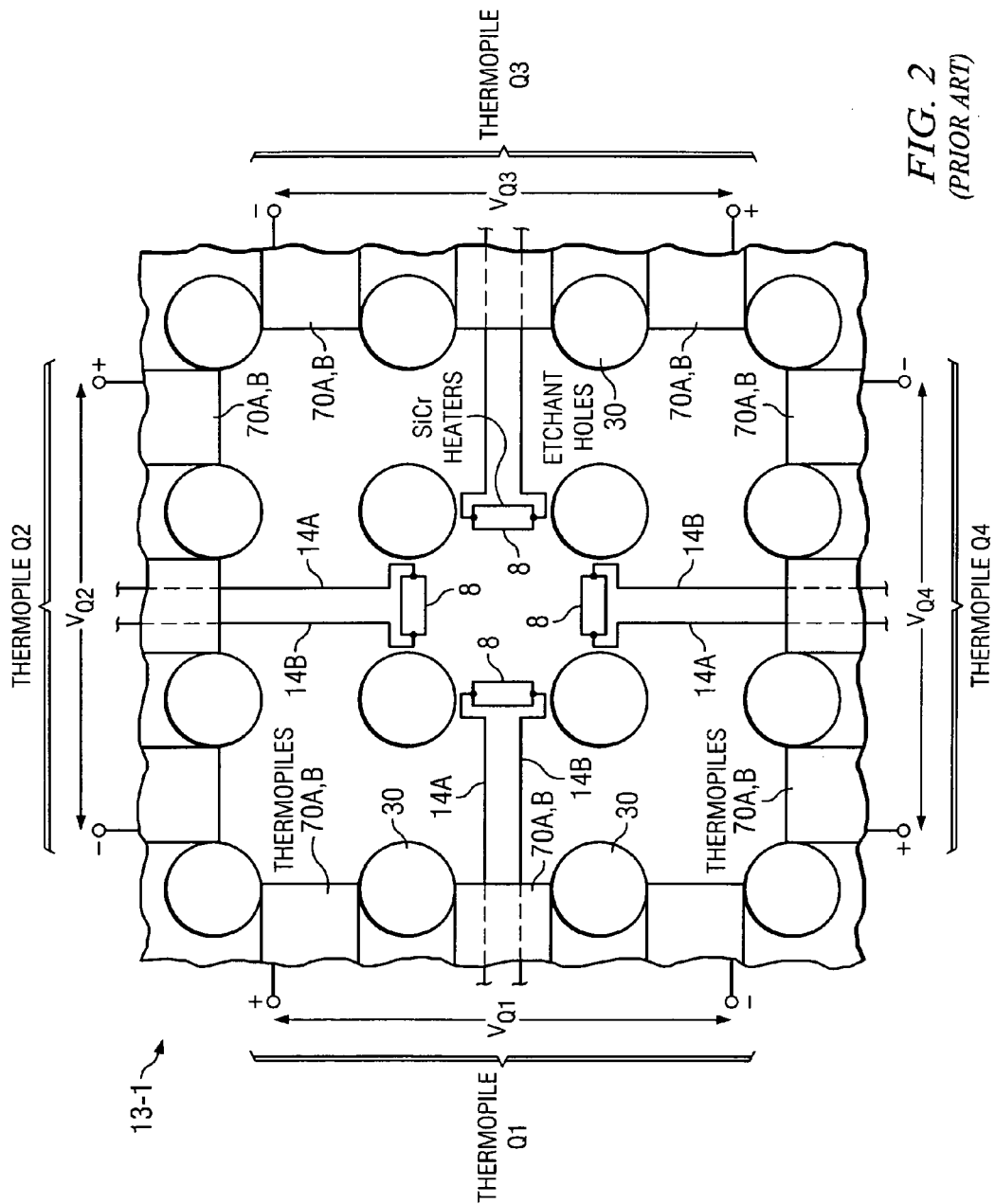
FIG. 2 shows a partial plan view of a conventional heated air mass accelerometer sensor using a large number of the accelerometer cells of FIG. 1.

In some embodiments of the invention presently under development, the SNR of unitized sensor cell 1-2 is approximately 10 times greater than the SNR that can be achieved using the conventional sensor cell shown in Prior Art FIG. 1. This is because the SNR of each unitized sensor cell 1-2 is dominated by the resistance of the poly leg(s) of each thermocouple, and because in the conventional sensor cell of Prior Part FIG. 1, the length of the resistive poly material, and therefore its resistance, typically are more than 10 times greater than the corresponding length and resistance of poly trace 6 in unitized sensor cell 1-2 of FIG. 3. Since the thermal noise of the resistive poly material is proportional to the square root of the resistance, the noise in the conventional sensor cell will be three times greater than in unitized sensor cell 1-2 of FIG. 3. The chip area required for unitized sensor cell 1-2 in FIG. 3 may be only approximately a third of the chip area required for the closest prior art, so the overall thermocouple and/or thermopile efficiency and gain is increased by approximately a factor of 10.

Figure 4A:
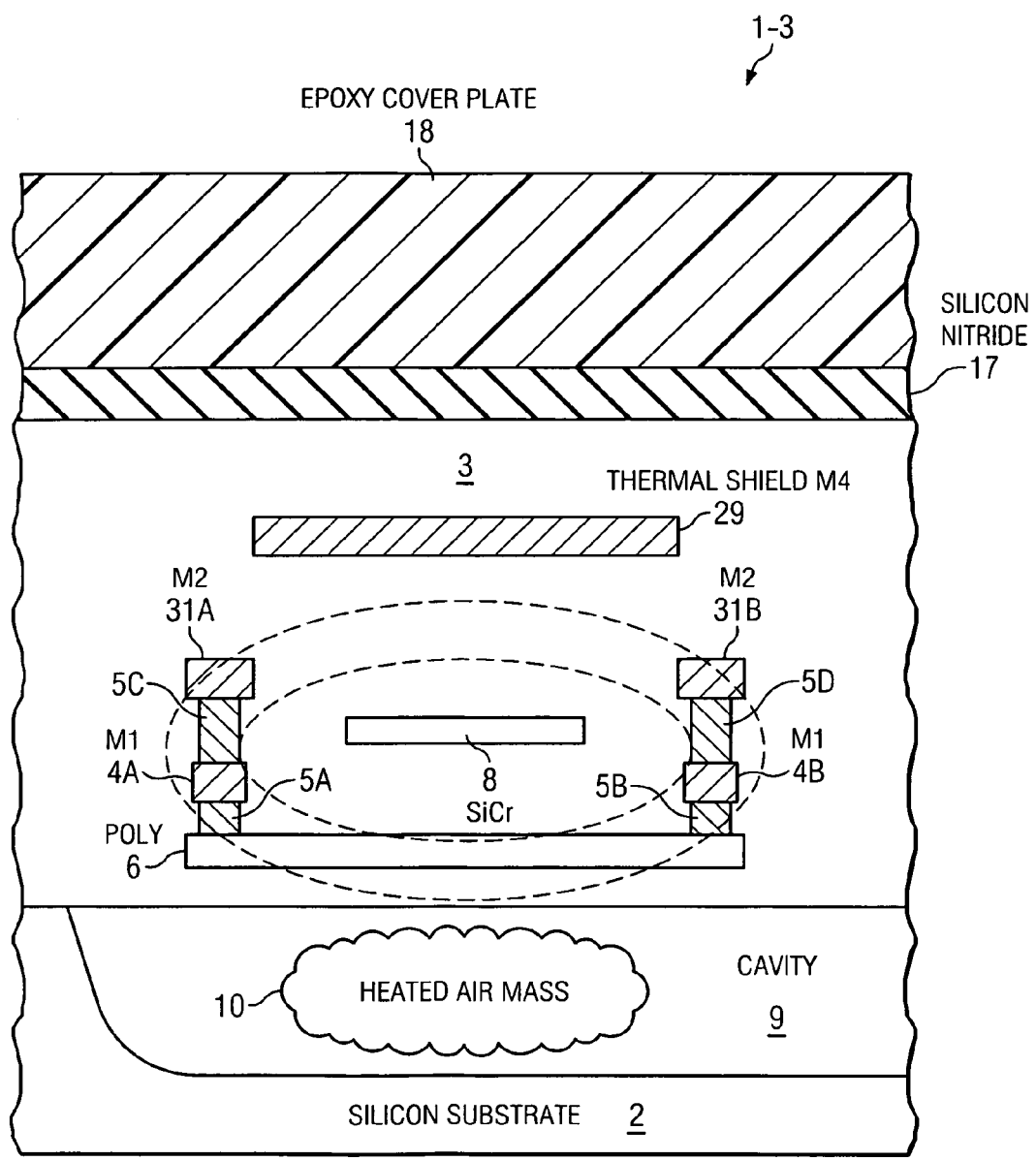
FIG. 4A shows a partial section view of a variation of the unitized sensor cell of FIG. 3.

FIG. 4A shows a unitized sensor cell 1-3 which is a variation of sensor cell 1-2 in FIG. 3. Sensor cell 1-3 in FIG. 4A does not include upper dome chamber 12 and upper heated air mass 11 in FIG. 3. Instead, a metal thermal shield 29 is provided above the differential thermocouple to isolate it from the effects of external heat sources located above unitized sensor cell 1-3. A protective silicon nitride layer 17 is disposed on the upper surface of dielectric stack 3, and an epoxy cover plate 18 is provided on the upper surface of silicon nitride layer 17. Metal traces 4A and 4B are patterned in a first metallization layer, referred to as the M1 metallization layer. A tungsten contact 5C extends through a dielectric layer (not shown) of region 3 located above the M1 layer to make contact with metallization trace 31A of a second metallization layer referred to as the M2 layer. If needed, this allows the voltage on metal trace 4A to be routed along trace 31A of the M2 metallization layer. Similarly, if needed, a tungsten contact 5D extends through the dielectric layer above the M1 layer to contact trace 31B of the M2 metallization layer. This allows the voltage on metal trace 4B to be routed along trace 31B of the M2 metallization layer. Sichrome heater 8 is symmetrically located over common poly trace 6, as in FIG. 3. (The elliptical dashed lines around sichrome heater 8 represent isotherms associated with the heat generated by it.) Silicon substrate 2, cavity 9, and heated air mass 10 in FIG. 4A are essentially the same as in FIG. 3.

Figure 4B:
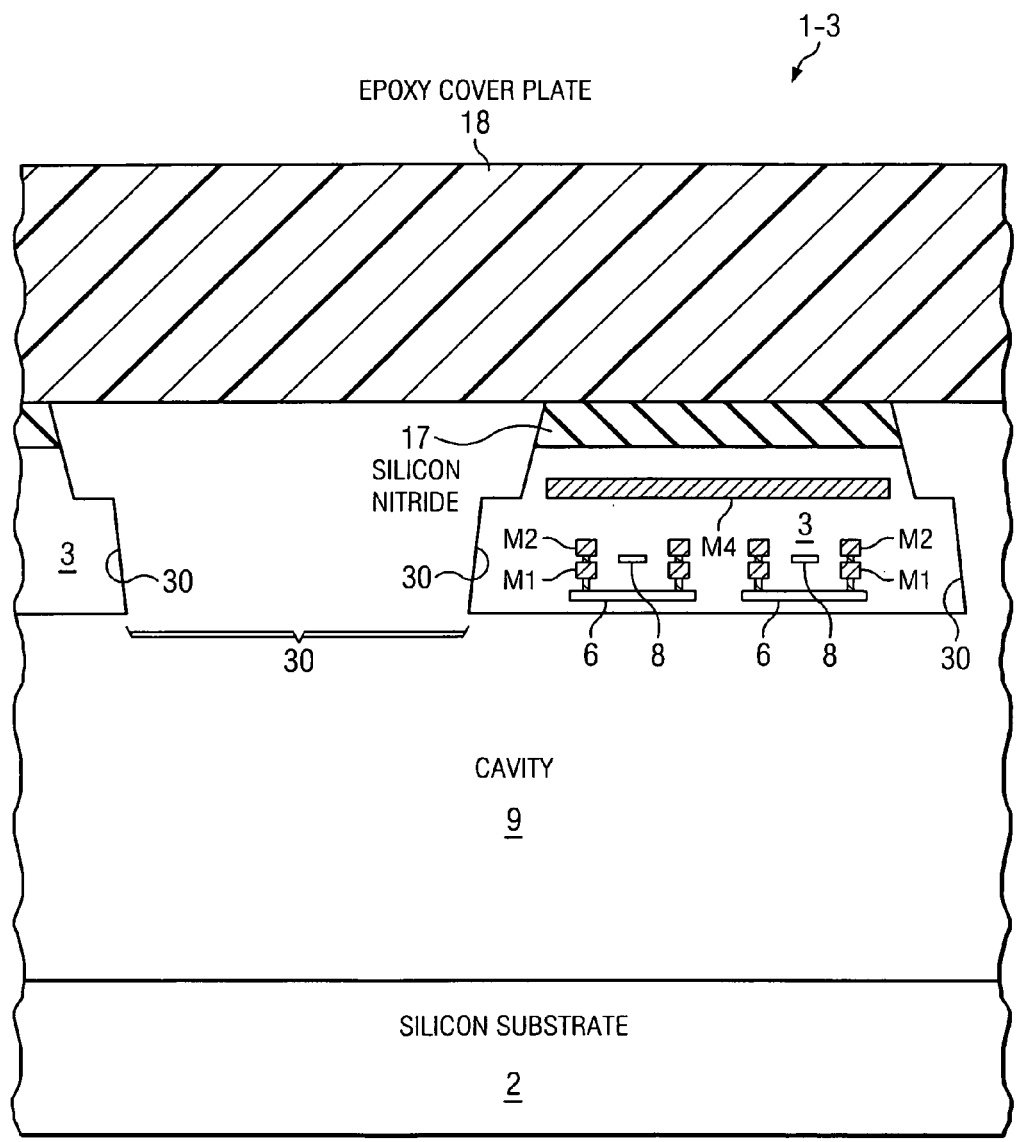
FIG. 4B shows a partial section view of a variation of the unitized sensor cell of FIG. 4A.

FIG. 4B shows a somewhat different representation of unitized sensor cell 1-3 in FIG. 4A to better illustrate the relative thicknesses of the dielectric region 3 and cavity 9. Two separate differential thermocouples are shown in FIG. 4B. FIG. 4B also shows the etchant openings 30 through which etchant is introduced in order to etch cavity 9 into silicon substrate 2. Etchant openings 30 extend through dielectric stack 3 and silicon nitride layer 17.

Figure 5:
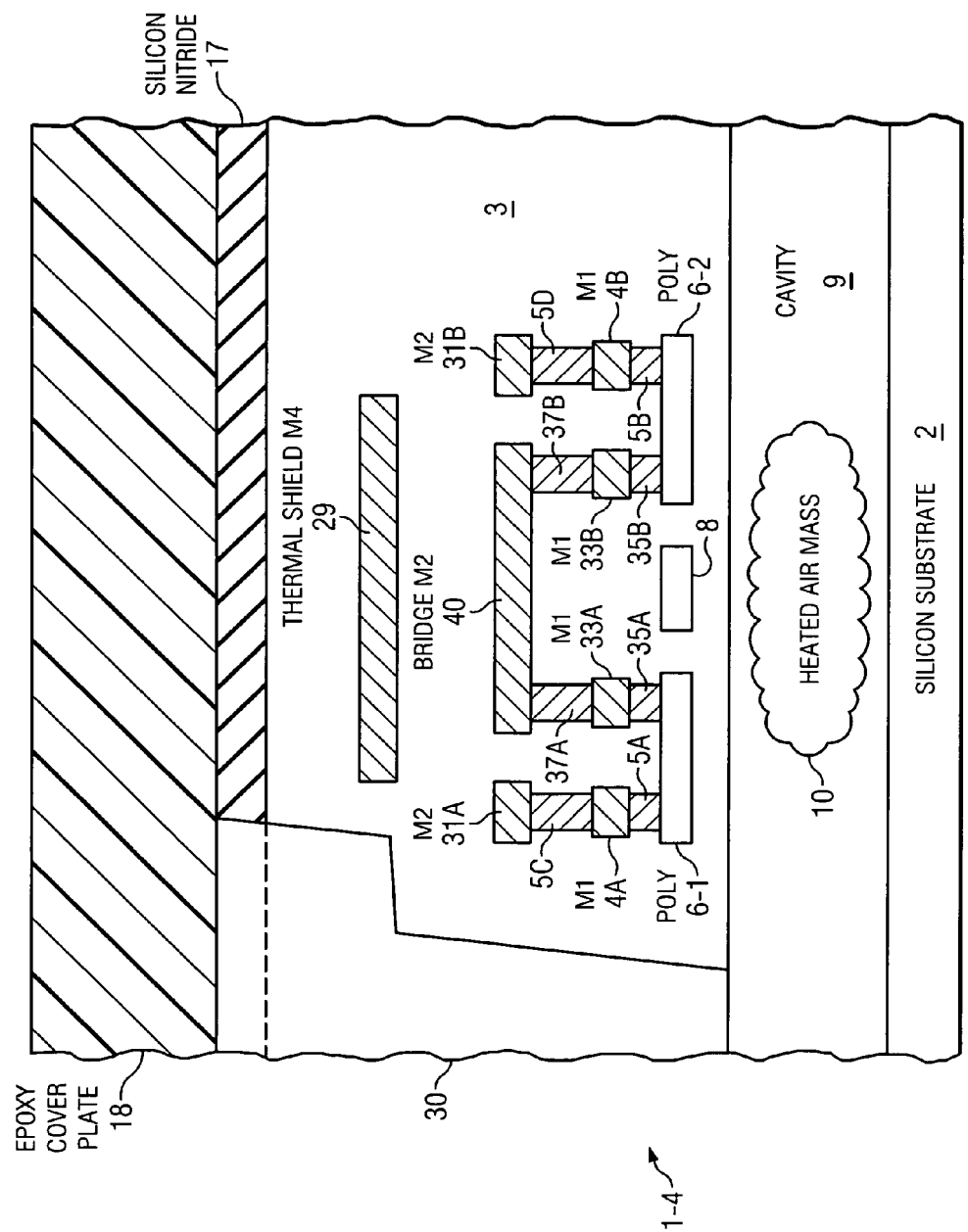
FIG. 5 shows a partial section view of another variation of the unitized sensor cell of FIG. 4A.

FIG. 5 shows a unitized sensor cell 1-4 which is another similar variation of unitized sensor cell 1-3 in FIG. 4A, wherein heater 8 is composed of polycrystalline silicon instead of sichrome. An advantage of using polycrystalline silicon for heater 8 is that it is located closer to cavity 9. This results in improved sensitivity of unitized sensor cell 1-4 to acceleration, tilting, etc. Poly heater 8 in FIG. 5 preferably is located symmetrically between the left and right portions of the differential thermocouple 13 (FIG. 3). Since poly heater 8 is in the same poly layer as common poly element 6 of the previously described differential thermocouples (FIGS. 3, 4A and 4B), the left portion 6-1 and the right portion 6-2 of common poly element 6 in FIG. 5 must be spaced apart to allow placement of poly heater 8 between them. In FIG. 5, this is accomplished by providing a metal "bridge" between the right end of left poly segment 6-1 and the left and of right poly segment 6-2. The metal bridge includes a tungsten contact 35A that contacts a metal trace 33A of the M1 metallization layer. Another tungsten contact 37A is connected between metal trace 33A and the left end of a bridge trace 40 formed in the M2 metallization layer. A tungsten contact 37B connects the right end of bridge trace 40 to metal trace 33B of the M1 metallization layer. A tungsten contact 35B connects metal trace 35B to left end 6-2 of common poly element 6.

Figure 6:
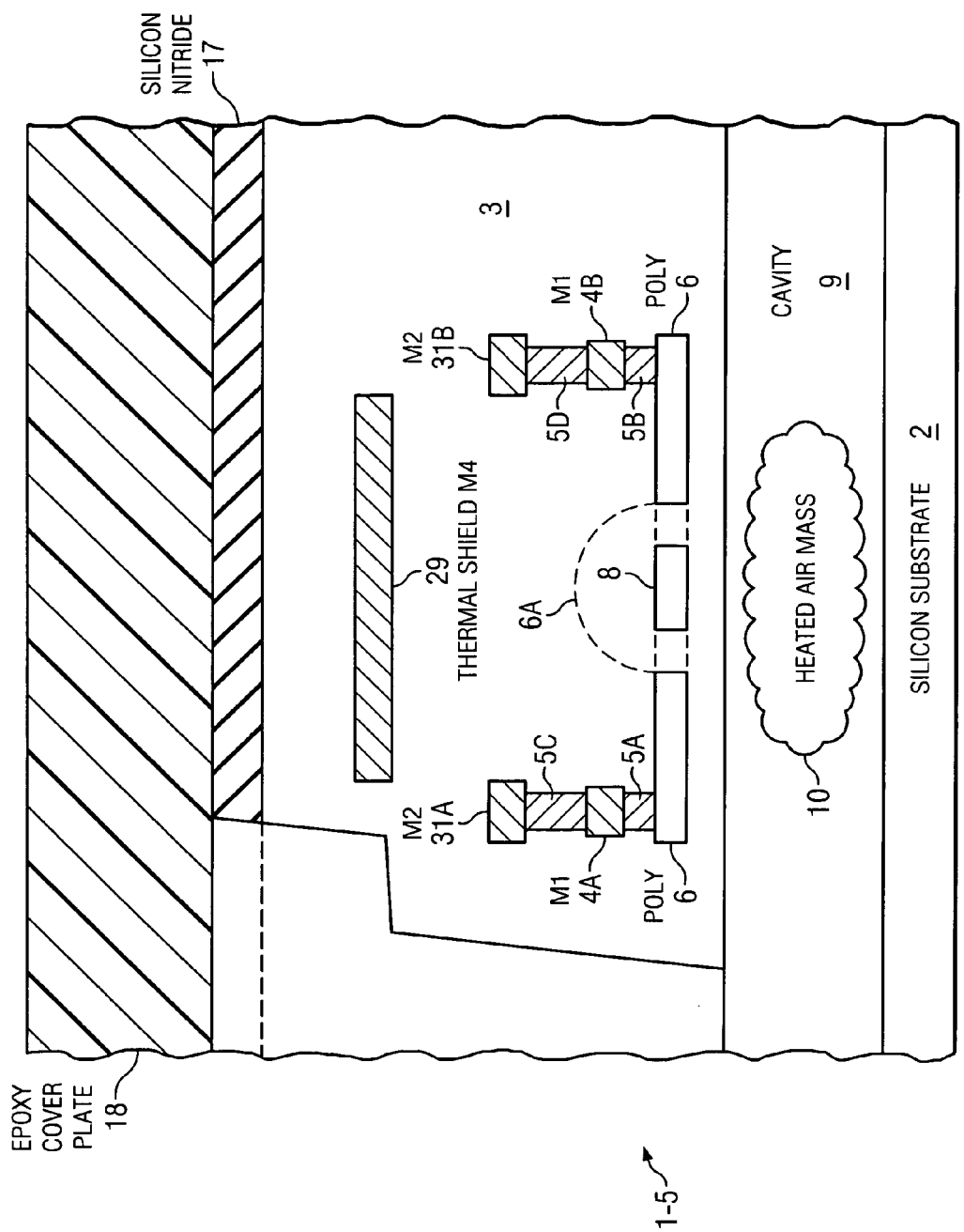
FIG. 6 shows a partial section view of yet another variation of the unitized sensor cell of FIG. 4A.

FIG. 6 shows a unitized sensor cell 1-5 which is a variation of unitized sensor cell 1-4 in FIG. 5 wherein heater 8 is composed of poly and is located symmetrically between left and right portions of common poly element 6. However, in FIG. 6 space is provided for poly heater 8 by routing a central part of common poly element 6 around (and in the same plane as) poly heater 8. The central part of the common poly element that is routed around and in the same plane as poly heater 8 is represented by dashed line 6A in FIG. 6.

Figure 7:
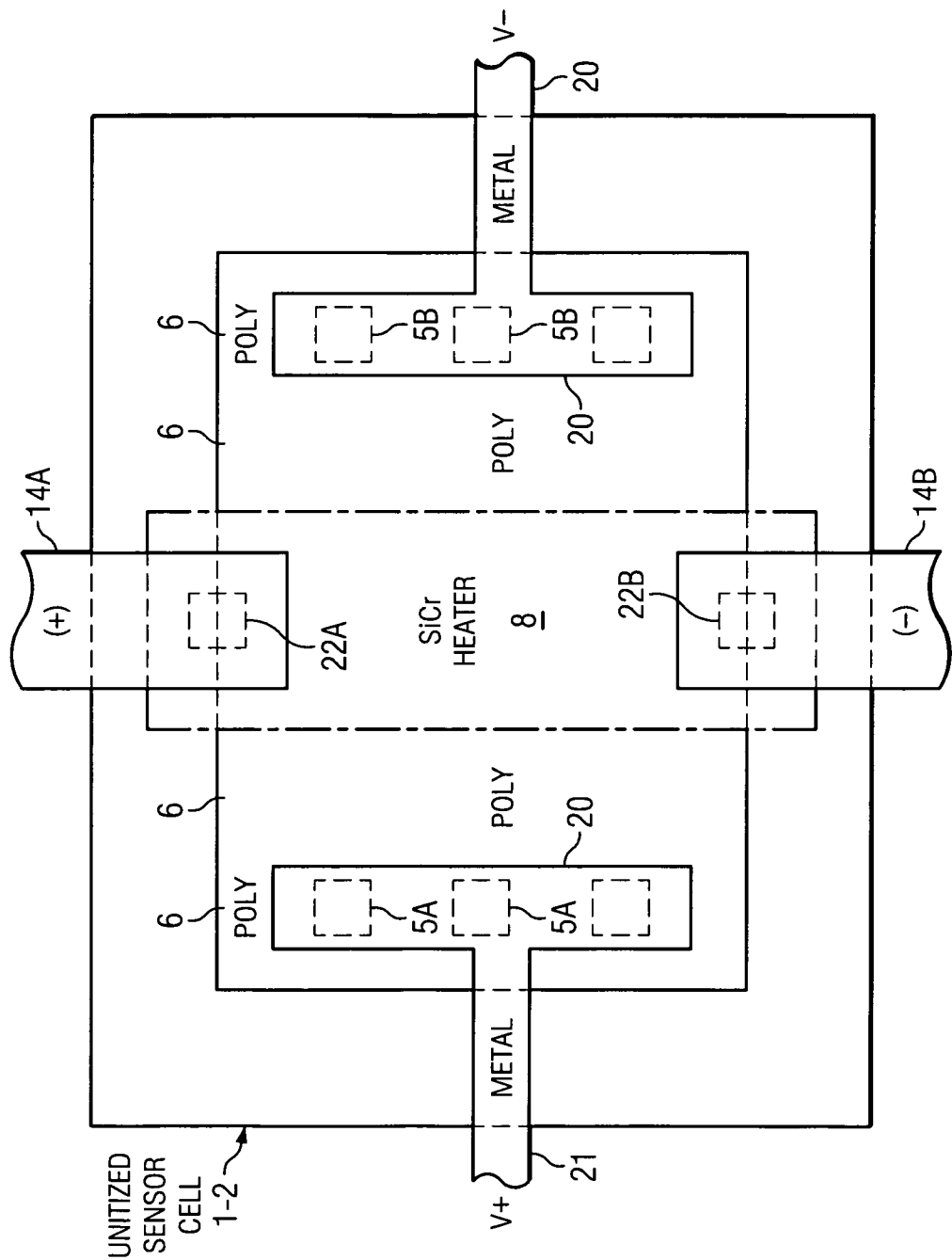
FIG. 7 shows a partial plan view of the unitized sensor cell of FIG. 3 or FIG. 4A.

FIG. 7 shows a partial plan view of unitized sensor cell 1-2 in FIG. 3. The unitized sensor cell terminal voltage r of sensor cell 1-2 is produced on T-shaped metal conductor 21 by sensor cell 1-2, and the other terminal voltage V⁻ is produced on T-shaped metal conductor 20. T-shaped conductor 21 contacts the left end of poly layer 6 by means of three tungsten contacts 5A, and T-shaped conductor 20 contacts the right end of poly layer 6 by means of three tungsten contacts 5B. Sichrome heater 8 is symmetrically positioned over the center portion of common poly layer or region 6, midway between tungsten contacts 5A and 5B. The upper end portion of sichrome heater 8 is connected to metal conductor 14A by tungsten contact 22A, and the lower end portion of sichrome heater 8 as illustrated in FIG. 7 is connected to metal conductor 14B by tungsten contact 22B.

Figure 8:
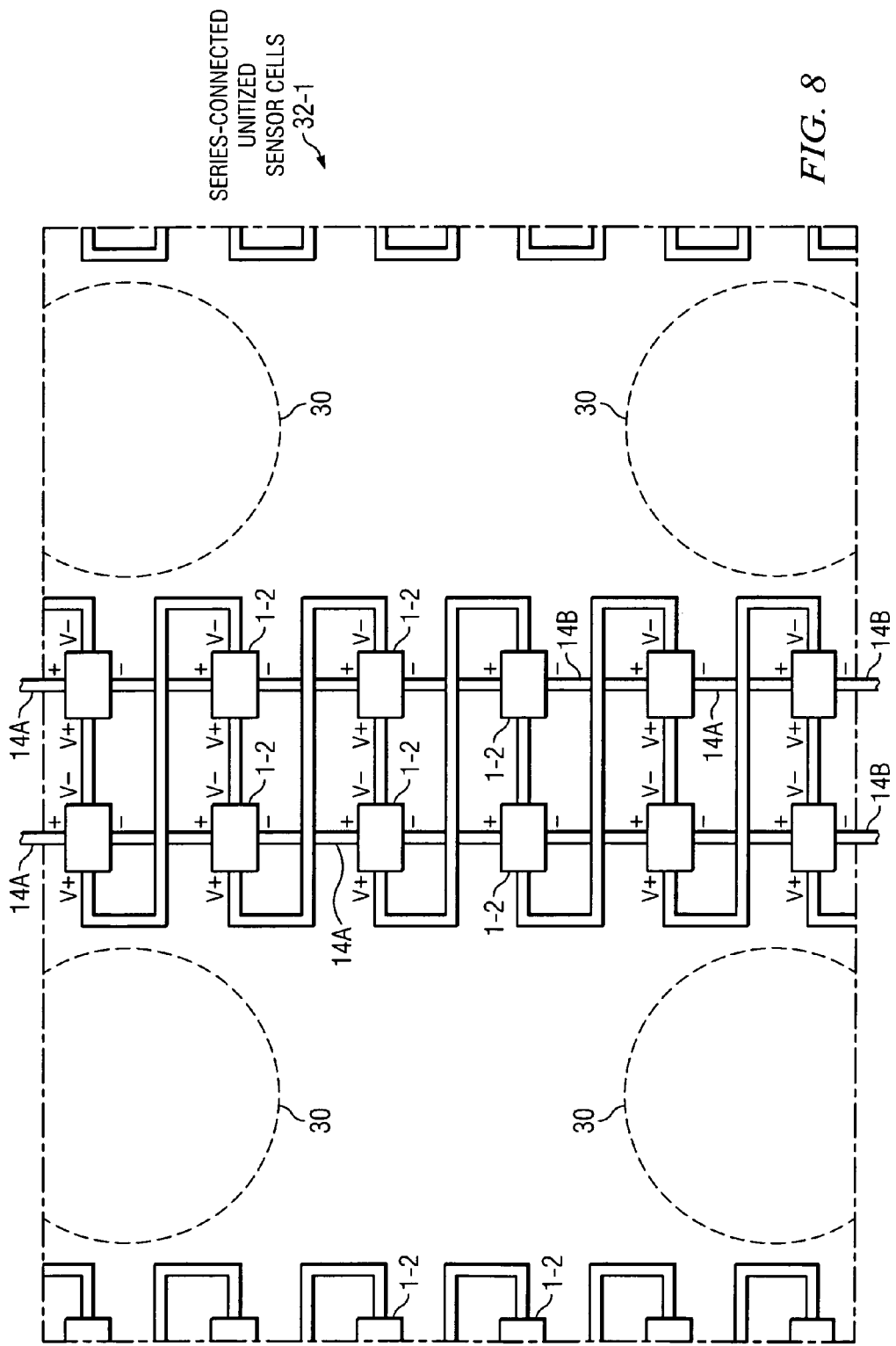
FIG. 8 shows a partial plan view of a portion of a heated air mass inertial sensor including a number of series-connected unitized sensor cells.

FIG. 8 shows a partial plan view 32-1 of the topology of a relatively large number of series-connected sensor cells 1-2 each having, for example, the configuration shown in FIG. 7. Dashed circular lines 30 designate large multiple etchant holes (also see FIG. 4B) through which etchant is introduced in order to etch a single large cavity 9 in silicon substrate 2 of the integrated circuit chip (e.g., accelerometer chip 16 in FIG. 3) in which the series-connected unitized sensor cells 1-2 in FIG. 6 are fabricated. The V⁺ terminal of each sensor cell 1-2 is connected to the V⁻ terminal of the next, so that the small differential output signals V⁺−V⁻ generated by all of the series-connected sensor cells 1-2, respectively, are summed so as to generate a sufficiently large signal to be suitably amplified and digitized to provide a digital signal $D_{OUT}$ (e.g., see FIG. 12) that represents the sensed acceleration of the accelerometer.

The sichrome heaters 8 of the sensor cells 1-2 are connected in series. That is, the (+) terminal of each sichrome heater is connected to the (−) terminal of the next series-connected sichrome heater. The current driven through all of the series-connected sichrome heaters 8 determines the amount of heat generated by each heater, and is relatively independent of the small voltage drop across each sichrome heater 8.

Figure 9:
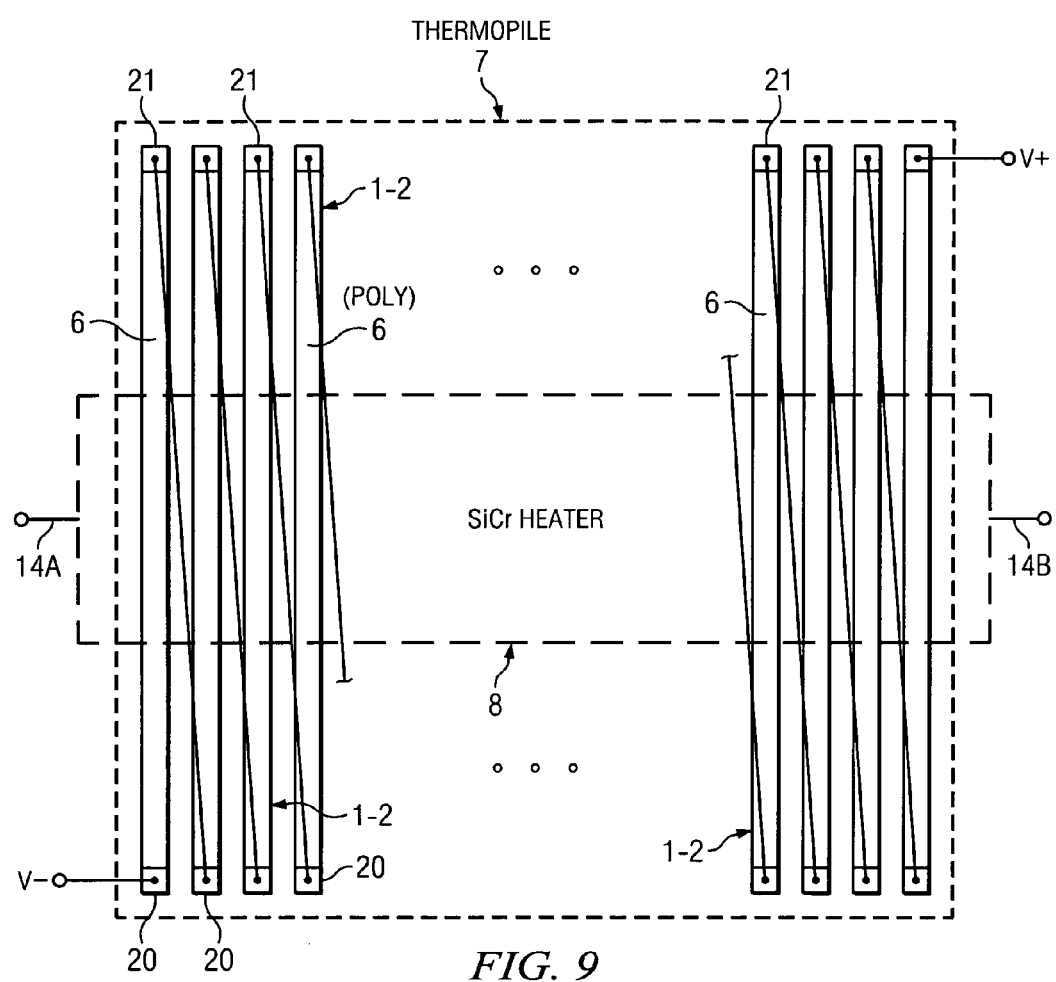
FIG. 9 shows a partial plan view of a portion of a heated air mass inertial sensor including an alternate embodiment of the unitized sensor of FIG. 3.

FIG. 9 shows an alternate arrangement of the differential thermocouples and a common heater in unitized sensor cells 1-2. The elongated differential thermocouples 1-2 are positioned side-by-side, and are connected in series to form a thermopile 7. A single, relatively large common sichrome heater 8 is disposed midway between the metal terminals 21 and 20 of all of the differential thermocouples of the unitized sensor cells 1-2 in thermopile 7. Therefore, a relatively large air mass 10 (not shown) in the cavity (not shown) under the thermopile 7 is heated by sichrome heater 8. If thermopile 7 is subjected to acceleration, the relatively large air mass undergoes movement relative to a location closer either to all of the (+) thermocouple junctions or all of the (−) thermocouple junctions, thereby generating a voltage difference which accurately represents the acceleration associated with the movement. A relatively high density of differential thermocouples may be achieved by this embodiment of the invention.

Figure 10:
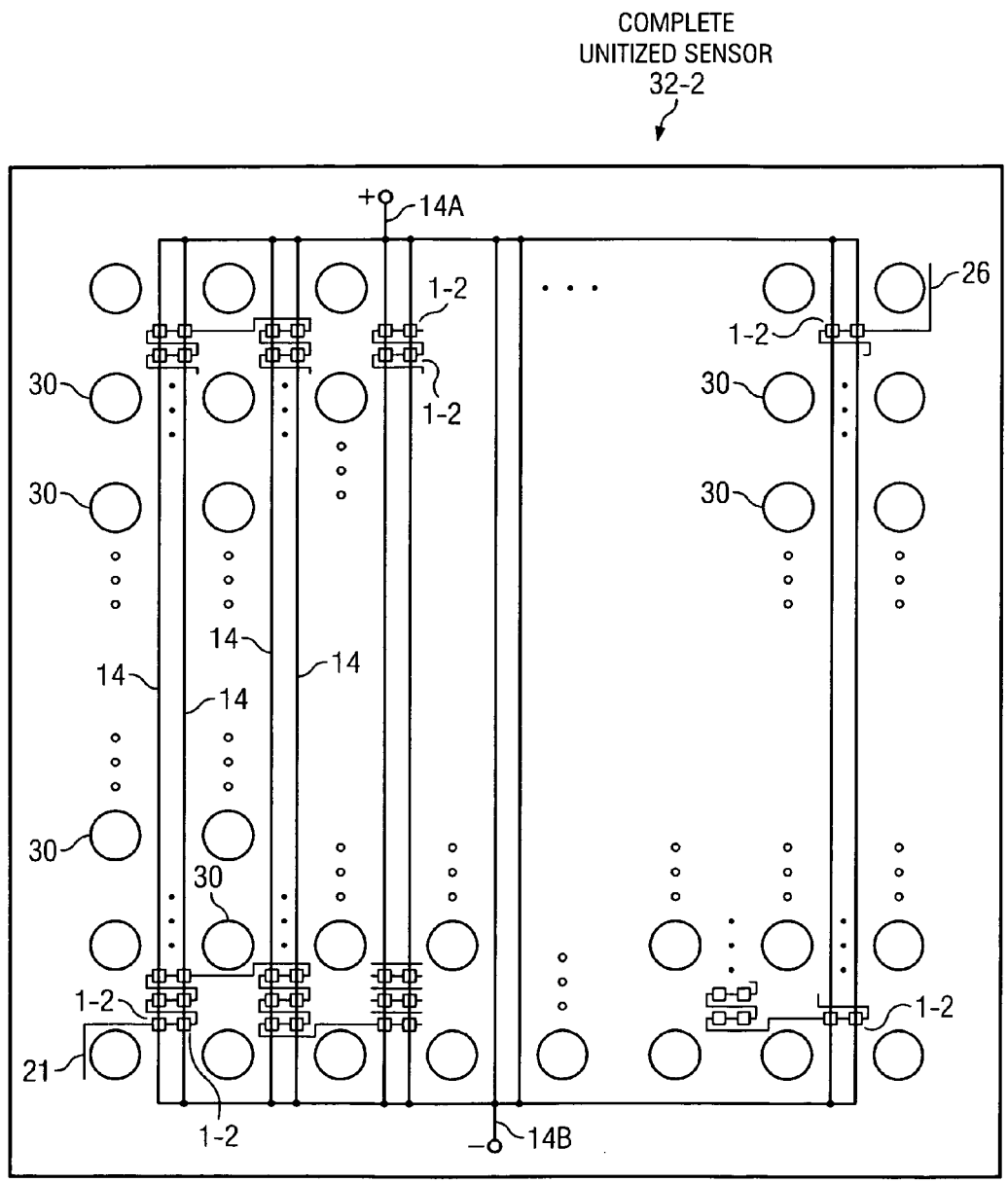
FIG. 10 shows a partial plan view of a heated air mass inertial sensor including the arrangement of FIG. 8.

FIG. 10 shows a complete unitized sensor 32-2 including a very large number (e.g., from a few hundred to more than 1000) of series-connected sensor cells 1-2 connected in the manner indicated in FIG. 8.

Figure 11:
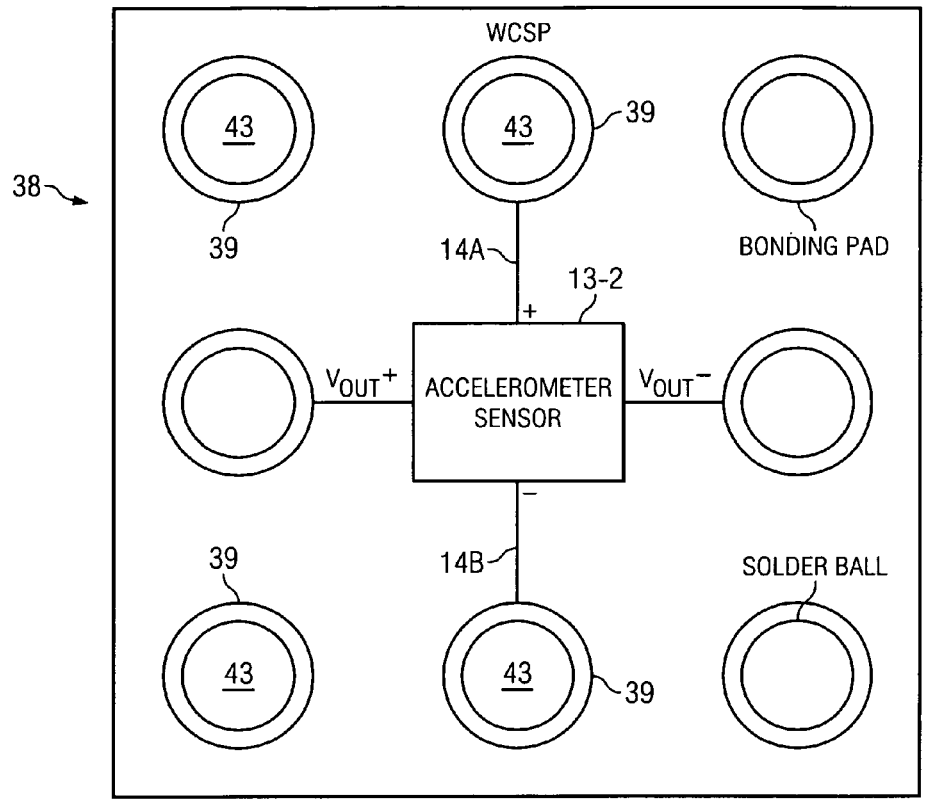
FIG. 11 shows a plan view of the heated air mass inertial sensor of FIG. 10 as part of a WCSP integrated circuit package.

FIG. 11 shows the accelerometer sensor 13-2 of FIG. 10 included in a larger integrated circuit chip as part of a WCSP (wafer level chip scale package) that also includes a number of bonding pads 39. Each bonding pad 39 has thereon a corresponding solder ball 43 by means of which the accelerometer sensor 32-2 may be attached to a printed circuit board or the like.

Figure 12:
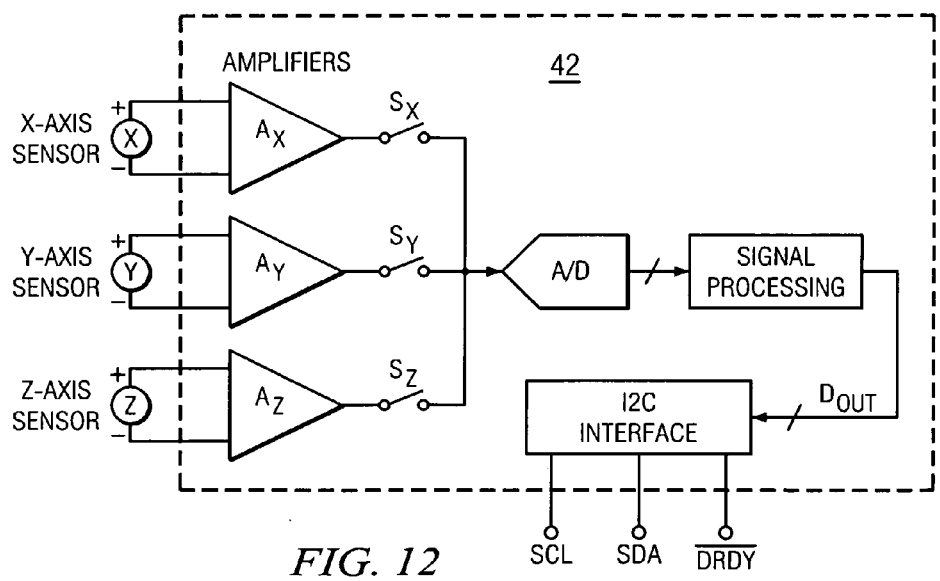
FIG. 12 is a block diagram of circuitry for processing signals generated by the inertial sensor cells of the present invention.

FIG. 12 is a block diagram of an XYZ accelerometer including a X-axis sensor and a Y-axis sensor, both of which may be implemented by means of the previously described accelerometer sensors. The Z-axis sensor may be implemented separately, for example, on a different integrated circuit than the X-axis and Y-axis sensors. The XYZ accelerometer also includes circuitry 42, which may be implemented on the same integrated circuit as the X-axis and Y-axis sensors, using conventional CMOS circuitry. (FIG. 3 indicates how CMOS circuitry 42 may be implemented on the same chip along with the previously described unitized differential sensor cells.) The output of each of the X-axis sensor and the Y-axis sensor is connected between the differential input terminals of a corresponding amplifier Ax and Ay, respectively. The output of each amplifier is coupled by a switch, e.g., switch Sx or switch Sy, to the input of a CMOS analog to digital converter. The digital output of the analog to digital converter is applied to a suitable digital signal processing circuit, the digital output $D_{OUT}$ of which is provided as an input to a suitable interface circuit. The interface circuit may be a conventional I²C interface circuit that provides a serial digital data output on its SDA terminal.

Instead of having two voltages, with acceleration represented by the difference between the two differential voltages, the acceleration of the described embodiments of the invention is represented by a single differential voltage $V_{IN}^+$ minus $V_{IN}^-$, instead of being represented by the difference between two differential voltages.

Figure 13:
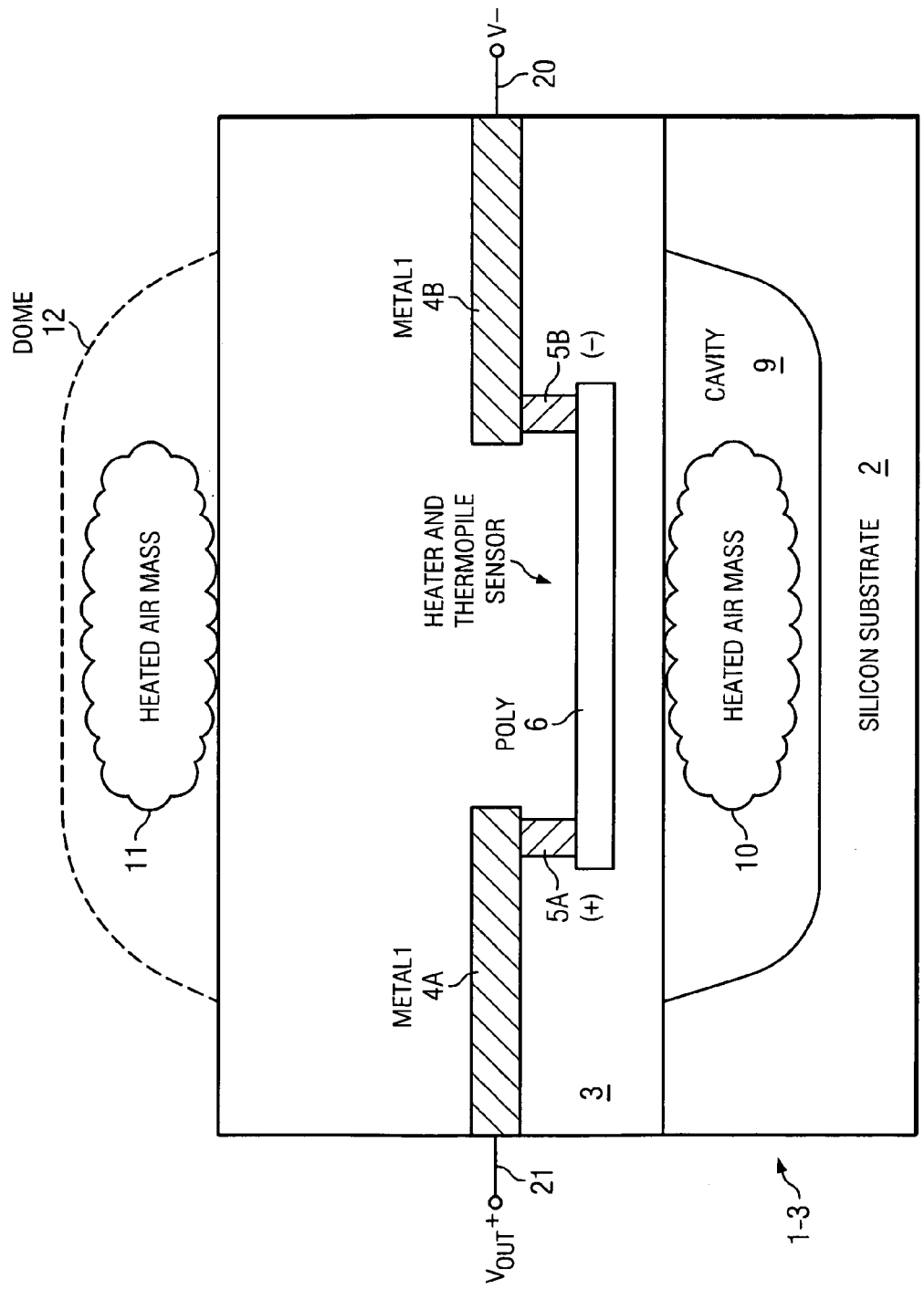
FIG. 13 shows a partial section view of a heated air mass unitized sensor in which a common poly element of a differential thermocouple also serves as a heating element.

FIG. 13 shows a partial section view of a heated air mass unitized sensor 1-3 in which a common poly element of a differential thermocouple also serves as a heating element. Unitized sensor 1-3 includes heated air masses 10 and 11 as in FIG. 3, and also includes a differential thermocouple including metal traces 4A and 4B and a poly trace 6. One end of poly trace 6 is coupled to an end of metal trace 4A by means of tungsten contact 5A to form a (+) thermocouple junction, and the other end of poly trace 6 is coupled to an end of metal trace 4B by means of tungsten contact 5B to form a (−) thermocouple junction. However, no separate heater element 8 is included, unlike the previously described unitized sensors 1-2.

Figure 14:
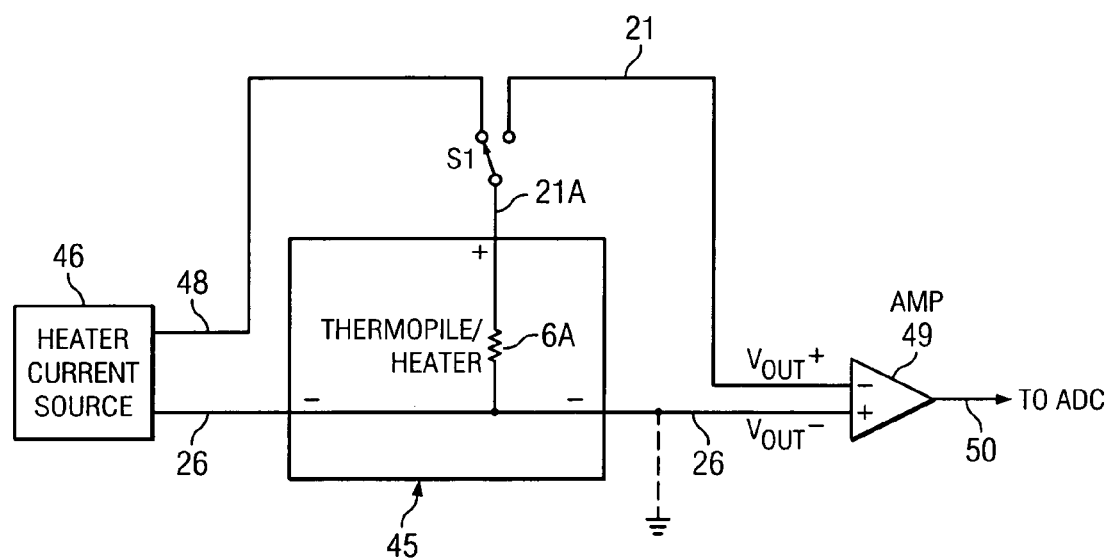
FIG. 14 is a schematic diagram illustrating circuitry for switching the common poly element of FIG. 13 between heating and sensing modes of operation.

Instead, the common poly elements 6 in a thermopile composed of unitized sensors 1-3 of FIG. 13 all are connected in series, as represented by poly resistor 6A in FIG. 14. A (−) terminal of a heater current source circuit 46 is connected by conductor 26 to the (−) terminal of poly resistor 6A and to the (+) input of an amplifier 49. A (+) terminal of heater current source 46 is connected by conductor 48 to one terminal of switch S1. The pole terminal 21A of switch S1 is connected to the (+) end of poly resistor 6A. The other terminal of switch S1 is connected by $V_{OUT}^+$ conductor 21 to the (−) input of amplifier 49. A heater current is forced through poly resistor 6A for a predetermined amount of time during a "heating phase" in which (1) the unitized sensors 1-3 of FIG. 13 are isolated from the $V_{OUT}^+$0 conductor 21 and (2) the air masses 10 and 11 of all of the unitized sensor cells 1-3 are heated.

Then, during a "measurement phase" the heater current source 46 is electrically disconnected from poly resistor 6A and then is connected between $V_{OUT}^+$ conductor 21 and $V_{OUT}^-$ conductor 26, which typically is connected to ground. Conductors 21 and 26 are connected to the (−) and (+) inputs of an amplifier 49, the output 50 of which may be applied to the analog input of the analog to digital converter. The thermocouple or thermopile voltage is measured. The thermal time constant of the heated air masses 10, 11 is sufficiently long to allow accurate measurement of the acceleration, tilting, etc., while the heating current is disabled. Amplifier 49 and heater current source 46 both may be included in CMOS circuitry 42 in FIG. 3. The heating interval may be approximately 80 microseconds and the measurement time may be approximately 10 microseconds, and the total heating resistance 6A may be approximately 200 kilohms.

An advantage of the above described embodiments of the invention is that the cumulative length of the resistive poly material, and therefore its resistance, is much less than the corresponding cumulative length and resistance of poly traces 6A and 6B of the prior art sensor cell shown in FIG. 1. Consequently, another advantage of the described embodiments of the invention is that the SNR thereof is substantially less than that of the closest prior art. Furthermore, the amount of integrated circuit chip area required for the described unitized sensor cells of the present invention is substantially less than the amount of chip area required for the closest prior art, so the overall thermocouple efficiency and gain efficiency is substantially greater than that of the prior art.

A further advantage of the embodiment of the invention shown in FIGS. 13 and 14 is that the length of the poly traces 6 is less than is the case for the previously described embodiments. Consequently, the amount of integrated circuit chip area required is less, and therefore the cost also is less than that of the previously described embodiments. The resistance of the poly traces 6 also is less, resulting in lower SNR of them the previously described embodiments.

Another advantage of the above described embodiments of the invention is that there is no need for expensive MEMS (microelectromechanical systems) processing. Therefore, the invention allows providing of a low cost inertial sensor which can be widely used in various consumer applications, such as in cell phones. Other advantages include low cost and ease of assembly of the described sensor 16. Yet another advantage of the described embodiments is that standard WCSP packaging nevertheless can be used without having to provide any special protection of the cavity. Increased sensor signal resolution is achieved as a result of the improved signal to noise ratio, and increased amplitude of the sensor output signal also is achieved. Increased sensor signal resolution is achieved as a result of the improved signal to noise ratio, and increased amplitude of the sensor output signal also is achieved. Another advantage of the invention is that there is no need for a separate heater element.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. An inertial sensor comprising:
(a) a differential thermocouple including first and second metal traces, a single polycrystalline silicon poly trace, a first contact element electrically coupling a first end of the first metal trace to a first end of the single poly trace to form a first thermocouple junction, and a second contact element electrically coupling a first end of the second metal trace to a second end of the single poly trace to form a second thermocouple junction, the differential thermocouple producing a differential voltage between second ends of the first and second metal traces;
(b) a heating device aligned with respect to the first and second thermopile junctions; and
(c) a region proximate to a heater and the poly trace enclosing a mass of gas that is heated by the heater and is located symmetrically with respect to the first and second thermocouple junctions while the differential thermocouple has a predetermined initial orientation and a predetermined initial acceleration that result in balanced thermal coupling between the heated gas mass and the first and second thermocouple junctions so as to cause a predetermined initial value of the differential voltage;
(d) whereby a change in the predetermined initial orientation or the predetermined initial acceleration shifts the location of the heated gas mass relative to the first and second thermocouple junctions so as to cause a corresponding change in the differential voltage.

2. The inertial sensor of claim 1 wherein the heating device includes at least one poly trace functioning part time as a poly heating element, a heater current source, and a switch having a pole terminal coupled to one of the first and second metal traces, a first terminal coupled to the heater current source, and a second terminal coupled to a sensing circuit.

3. The inertial sensor of claim 2 wherein the poly heating element includes a plurality of poly traces of a plurality of differential thermocouples, respectively, connected in series.

4. The inertial sensor of claim 1 wherein the region is bounded by a cavity in a semiconductor substrate supporting a dielectric region in which the differential thermocouple and the heater are disposed.

5. The inertial sensor of claim 1 wherein the differential thermocouple is included in a sensor cell and wherein the heater and the heated gas mass are associated with the sensor cell, the inertial sensor including a plurality of such sensor cells connected in series such that sensor cell differential voltages are summed.

6. The inertial sensor of claim 5 wherein each sensor cell includes a separate heater and a corresponding heated gas mass, respectively.

7. The inertial sensor of claim 5 wherein each sensor cell shares the heater and the heated mass with other sensor cells.

8. The inertial sensor of claim 6 wherein the heater is composed of sichrome located on a different level of a dielectric region than the poly trace.

9. The inertial sensor of claim 6 wherein the heater is composed of poly located on the same level of a dielectric region as the poly trace.

10. The inertial sensor of claim 7 wherein the poly trace includes first and second portions located adjacent to opposed ends, respectively, of a poly heater, the inertial sensor including a metal bridge electrically connecting the first and second portions of the poly trace.

11. The inertial sensor of claim 9 wherein a portion of the poly trace is routed around a poly heater.

12. The inertial sensor of claim 5 wherein the region is bounded by a cavity in a semiconductor substrate supporting a dielectric region in which the first thermocouple junction and heater are disposed, wherein the cavity extends beneath all of the plurality of sensor cells.

13. The inertial sensor of claim 5 including CMOS circuitry coupled to receive a sum of the differential voltages generated by the plurality of sensor cells.

14. The inertial sensor of claim 13 wherein the CMOS circuitry includes an amplifier for amplifying the sum of the differential voltages and an analog to digital converter for digitizing an output signal produced by the amplifier.

15. The inertial sensor of claim 12 wherein the inertial sensor is included in a semiconductor chip that is part of a WCSP package.

16. The inertial sensor of claim 1 including a thermal shield in a dielectric region and located over the differential thermocouple to isolate the differential thermocouple from effects of external heat.

17. An inertial sensor method comprising:
(a) providing a differential thermocouple including first and second metal traces and a unitary polycrystalline silicon poly trace by electrically coupling a first end of the first metal trace to a first end of the poly trace to form a first thermocouple junction and by electrically coupling a first end of the second metal trace to a second end of the poly trace to form a second thermocouple junction, the differential thermocouple producing a differential voltage between second ends of the first and second metal traces, the differential voltage being representative of a temperature difference between the first and second thermocouple junctions; and
(b) heating a mass of gas that is located generally symmetrically with respect to the first and second thermocouple junctions while the differential thermocouple has a predetermined initial orientation and a predetermined initial acceleration that result in balanced thermal coupling between the heated gas mass and the first and second thermocouple junctions so as to cause a predetermined initial value of the differential voltage;
(c) whereby a change in the predetermined initial orientation or the predetermined initial acceleration shifts the location of the heated gas mass relative to the first and second thermocouple junctions so as to cause a corresponding change in the differential voltage.

18. The method of claim 17 including operating at least one poly trace functioning as a poly heating element for a predetermined amount of time and then, after a predetermined delay, coupling one of the first and second metal traces to a terminal coupled to a sensing circuit.

19. The method of claim 17 including connecting a plurality of the differential thermocouples in series in a dielectric region such that the differential voltages of the plurality of differential thermocouples are summed, wherein a heater and the heated gas mass are associated with at least one of the differential thermocouples.

20. The method of claim 17 including connecting a plurality of the differential thermocouples in series in a dielectric region such that the differential voltages of the plurality of differential thermocouples are summed, wherein each of the differential thermocouples includes a corresponding heater and a corresponding heated gas mass.

21. The method of claim 17 including providing a semiconductor chip including the thermocouples and a heated air mass as part of a WCSP package.

22. An inertial sensor comprising:
(a) a differential thermocouple including first and second metal traces and a unitary polycrystalline silicon trace by electrically connecting a first end of the first metal trace to a first end of the poly trace to form a first thermocouple junction and by electrically connecting a first end of the second metal trace to a second end of the poly trace to form a second thermocouple junction, the differential thermocouple producing a differential voltage between second ends of the first and second metal traces, the differential voltage being representative of a temperature difference between the first and second thermocouple junctions; and
(b) means for heating a mass of gas that is located generally symmetrically with respect to the first and second thermocouple junctions while the differential thermocouple has a predetermined initial orientation and a predetermined initial acceleration that result in balanced thermal coupling between the heated gas mass and the first and second thermocouple junctions so as to cause a predetermined initial value of the differential voltage;
(c) whereby a change in the predetermined initial orientation or the predetermined initial acceleration shifts the location of the heated gas mass relative to the first and second thermocouple junctions so as to cause a corresponding change in the differential voltage.

* * * * *